Aug. 21, 1934.  F. A. BRAUCHT ET AL  1,971,128
EYEGLASSES OR SPECTACLES
Filed March 21, 1932   2 Sheets-Sheet 1
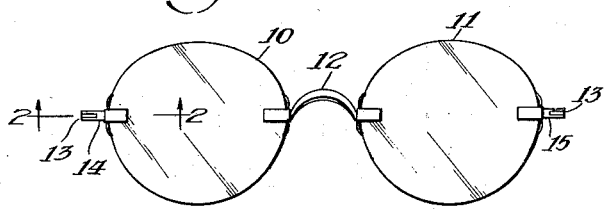
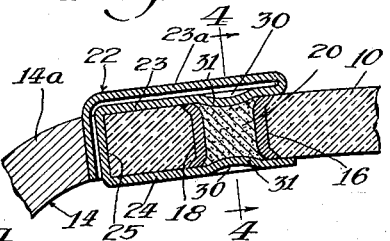
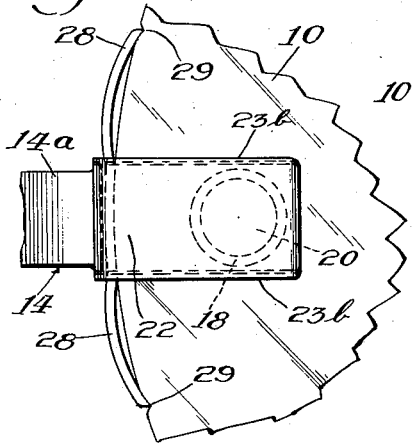
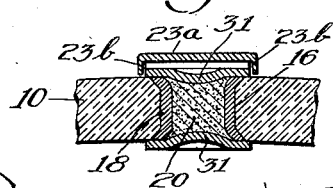
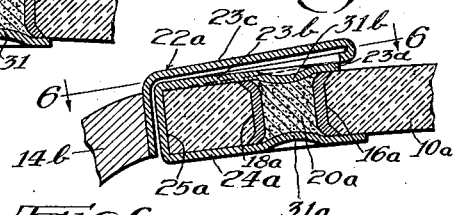
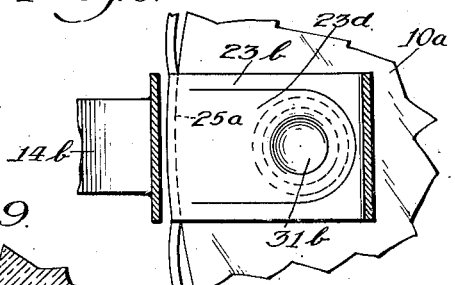
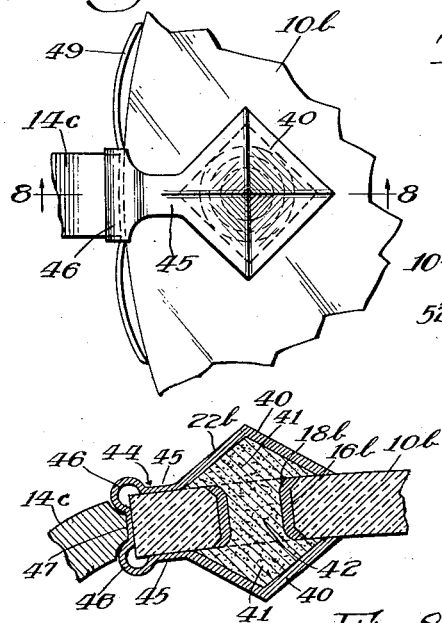
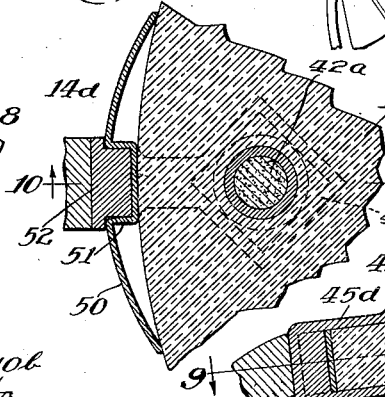
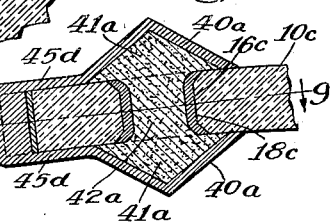
Inventors:
Frederick A. Braucht,
Austin B. Belgard.
By Dyrenforth, Lee, Chritton & Wiles,
Attorneys Aug. 21, 1934.  F. A. BRAUCHT ET AL  1,971,128
EYEGLASSES OR SPECTACLES
Filed March 21, 1932  2 Sheets-Sheet 2

Inventors:
Frederick A. Braucht,
Austin B. Belgard.
By Dyrenforth, Lee, Chritton & Wiles,
Attorneys Patented Aug. 21, 1934

1,971,128

UNITED STATES PATENT OFFICE 1,971,128

EYEGLASSES OR SPECTACLES

Frederick A. Braucht and Austin B. Belgard, Chicago, Ill., assignors to Belgard-Spero, Inc., a corporation of Delaware Application March 21, 1932, Serial No. 600,302

5 Claims. (Cl. 88—42)

This invention relates to eyeglasses or spectacles and particularly to means for mounting the lenses thereof.

A particular object of the invention is to provide resilient means for securing the lenses to the bows and bridge members of the eyeglasses or spectacles.

Another particular object of the invention is to provide improved means for securing resilient mounting members to the lenses.

Still another particular object of the invention is to provide improved means of the character described which will tend to prevent fracture of the lenses when the eyeglasses or spectacles are dropped or handled carelessly.

Other advantages and objects of the invention will become apparent as the following detailed description progresses, reference being had to the accompanying drawings, wherein:

Figure 1 is a front elevation of a pair of spectacles which embody the invention.

Fig. 2 is an enlarged section taken on line 2—2 of Fig. 1.

Fig. 3 is an enlarged fragmentary front elevation of a portion of the spectacles shown in Fig. 1.

Fig. 4 is a section taken on line 4—4 of Fig. 2.

Fig. 5 is a section through a lens mounting which embodies another form of the invention.

Fig. 6 is a section taken on line 6—6 of Fig. 5.

Fig. 7 is a front elevation of a lens mounting which embodies another form of the invention.

Fig. 8 is a section taken on line 8—8 of Fig. 7.

Fig. 9 is a section taken through a lens mounting which embodies another form of the invention, the section being taken on line 9—9 of Fig. 10.

Fig. 10 is a section taken on line 10—10 of Fig. 9.

Figure 11:
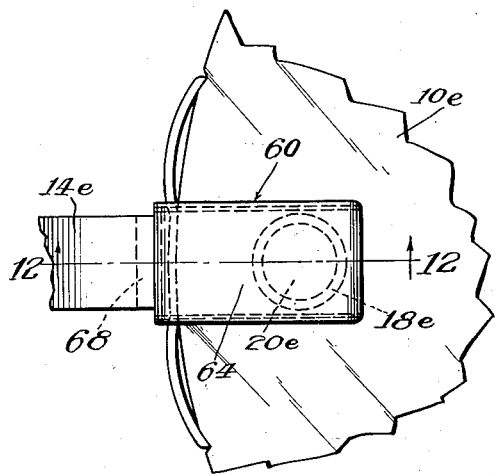
Fig. 11 is a front elevation of a lens mounting which embodies another form of the invention.

Referring for the present to Figs. 1 to 4, inclusive, wherein a preferred form of the invention is illustrated, the reference characters 10 and 11 designate the lenses of a pair of spectacles which also comprise a bridge member 12, bows 13 and bracket members 14 and 15 which operatively connect the bows 13 with the lenses 10 and 11, respectively.

The means for attaching the bridge 12 to the lenses 10 and 11 is identical with the means which attaches the bracket members 14 and 15 to these lenses, and therefore, a description of the bracket member 14 and the resilient members it comprises will be sufficient for the purpose of this disclosure.

Referring to Figs. 2 and 4, which are sections taken through the bracket member 14 and the lens 10, it will be noted that the lens 10 is provided with a drilled hole 16 which flares outwardly at its ends. Disposed in the drilled hole 16 is a tubular rivet 18 which has its outer ends riveted over to seat in the beveled or flaring ends of the hole 16. The ends of the rivet 18 are preferably extended slightly beyond the front and back surfaces of the lens 10.

The rivets 18 may be made from any suitable material but are preferably formed from brass or copper. The tubular rivet 18 is preferably filled with a quantity of solder 20, or any other suitable material which will form a bond between the rivet and certain portions of the bracket 14.

As shown, the bracket member 14 comprises a body portion 14a. A resilient member designated generally by the reference character 22 is formed integral with or soldered to the body portion 14a. The resilient member 22 comprises oppositely disposed integral bars 23 and 24 adapted to lie on opposite sides of the lens 10 in registry with the drilled holes 16, the bars 23 and 24 being connected to each other by an integral bar 25 engaging the edge of the lens 10. The bar 23 is bent back upon itself to provide a bar 23a which has its free end formed integral with or soldered to the body portion 14a. It will be noted that the bar 23a is spaced a slight distance, throughout most of its length, from the bar 23.

The resilient member 22 is formed from any suitable metal, preferably from an alloy comprising one of the noble metals. If necessary, the member 22 may be subjected to hammering or striking operations to "temper" it. The construction is such that the bar 23a is sufficiently resilient so that the lens 10 may be displaced slightly with respect to the body portion 14a of the bracket 14 without causing fracture of the lens.

As best shown in Fig. 4, the side edges of the bar 23a are provided with integral inwardly extending flanges 23b which prevent dust or dirt from entering the space between the bars 23 and 23a.

Formed integral with the bar 25 and extending laterally therefrom are relatively thin elongated lugs 28, the free ends of which engage notches 29 cut into the edge of the lens 10. The lugs 28 are preferably resilient. If the member 22 is formed from a noble metal or alloy thereof, this resiliency may be imparted to the lugs 28 by hammering or striking operations as is well known to those skilled in the art.

The bars 23 and 24 have depressions 30 formed in the outer surfaces thereof to provide portions 31 which project into the tubular rivet 18 and are secured to the tubular rivet 18 by the solder 20. When the member 22 is to be secured to the lens 10, the solder 20 is interposed into the tubular member 18 in the form of a cylindrical plug. The bars 23 and 24 are then brought into the positions wherein they are shown in Fig. 2 and the solder is fused. This method of securing a lens to its mounting is more fully described in our co-pending application Serial No. 566,734, filed October 3, 1931.

Referring now to Figs. 5 and 6 wherein another form of the invention is illustrated, the reference is illustrated. In this form, a lens 10b is provided with a drilled hole 16a substantially identical with the hole 16 described above. A bracket member 14b resembling the bracket member 14 described above is secured to the lens 10a, the bracket member 14b being provided with a resilient member 22a which resembles the member 22 described above. The member 22a comprises integral bars 23b, 24a and 25a. The bar 25a engages the edge of the lens 10a and the bars 23b and 24a are disposed on opposite sides of the lens. The bar 23b is bent back on itself to provide a bar 23c which is formed integral with or secured to the bracket member 14b. The bar 24a is provided with a projection 31a which resembles and has the same function as the projecting portions 31 described above. The bar 23b has a tongue 23d cut from it and the tongue 23d is provided with a projecting portion 31b which has the same function as the projecting portion 31a of the bar 24a. A quantity of solder 20a is disposed in a tubular rivet 18a fitting snugly in the hole 16a. The solder 20a is preferably fused after the member 22 has been assembled with the lens in the manner illustrated in Fig. 5 so that the solder secures the projections 31a and 31b to the tubular rivet.

In Figs. 7 and 8 another form of the invention is illustrated. In this form, a lens 10b is provided with a drilled hole 16b which is beveled at its outer ends. Fitting snugly in the drilled hole 16b is a tubular rivet 18b which is preferably formed from brass or copper. A bracket member 14c having the same function as the bracket member 14 described above is secured to the lens 10b by means comprising a member 22b. The member 22b may be formed integral with or soldered to the bracket member 14c. The member 22b preferably comprises two dished members 40 disposed on opposite sides of the holes 16b and filled with solder 41. The tubular rivet contains a quantity of solder 42. When the member 22b is assembled with the lens 10b, the quantities of solder 41 and 42 are fused to become an integral body which secure the dished members 40 to the tubular rivet 18b.

The dished members 40 are preferably formed integral with a resilient member 44 which comprises relatively thin and narrow bar portions 45 disposed on opposite sides of the lens 10b and joined to each other by integral spring portions 46 which, in turn, are joined to each other by a bar portion 47 disposed adjacent the edge of the lens 10b. It will be noted that the spring portions 46 are preferably arcuate in form and that they are spaced from the edge of the lens 10b in such manner that they will permit some movement of the bar portion 47 relative to the lens. The bar portions 45 also permit some movement of the bar portion 47 relative to the lens.

Preferably formed integral with the bar portion 47 are laterally extending lugs 49 which are preferably narrow in cross section and are preferably bowed so that only their ends engage the periphery of the lens 10b. The lugs 49 are preferably resilient. If the resilient portions of the mounting for the lens 10b are formed from a noble metal such as gold or an alloy thereof, the resiliency may be obtained by subjecting the portions in question to hammering or striking operations.

Figs. 9 and 10 illustrate another form of the invention in which a lens 10c is secured to a bracket member 14d which has the same function as the bracket member 14c described above. The bracket member 14b has resilient arms 45d preferably formed integral with it, the arms 45d being disposed on opposite sides of the lens 10c. Formed integral with the arms 45d are dished members 40a which contain solder 41a. The drilled hole 16c provided in the lens 10c has its outer ends beveled. Fitting snugly in the hole 16c is a tubular rivet 18c which is preferably identical with and has the same function as the tubular rivet 18 described above. The tubular rivet 18c is filled with solder 42a. To secure the cup-shaped members 48a to the tubular rivet 18c, the slot 41a and the solder 42a is fused after the parts have been assembled in the manner illustrated in Fig. 10.

Disposed between the body portion of the bracket member 14d and the adjacent edge of the lens 10c is a steel spring 50. The spring 50 is provided with a U-shaped central portion 51 engaging a lug 52 projecting from the bracket member 14d and held thereby in the position in which it is illustrated in Fig. 9. The ends of the spring 50 are curved and the free ends of the curved portions bear against the edge of the lens 10c. The resilient arms 45d co-operate with the spring 50 to permit some movement of the lens 10c relative to the bracket member 14d.

Figure 12:
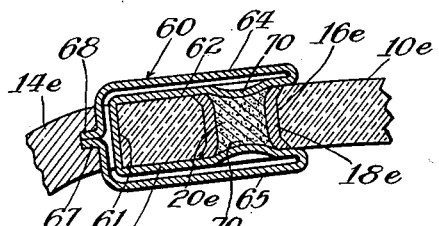
Fig. 12 is a section taken on line 12—12 of Fig. 11.

Another form of the invention is illustrated in Figs. 11 and 12. In this instance, a lens 10e is provided with a drilled hole 16e which is beveled at its outer ends. The tubular rivet 18e is preferably formed from copper or brass, fits snugly in the hole 16e and is filled with a quantity of solder 20e. The lens 10e secured to a bracket member 14e by a resilient mounting member which is designated generally by the reference character 60.

The member 60 comprises a U-shaped portion engaging the edge and the front and back surfaces of the lens 10e. This U-shaped portion comprises integral bars 61, 62 and 63, the bar 61 being in contact with the edge of the lens 10e. The bars 62 and 63 are bent back upon themselves to provide bars 64 and 65, respectively, which are spaced throughout most of their lengths from the bars 62 and 63. The free ends of the bars 64 and 65 are bent toward each other to provide a lug 67 which fits snugly in a notch 68 formed in the bracket member 14e. The bracket member 14e is soldered or otherwise secured to the adjacent portions of the bars 64 and 65. The bars 62 and 63 are provided with inwardly projecting portions 70 which project into the tubular rivet 18e and are secured thereto by the solder 20e.

The bars 64 and 65 preferably resemble the bar 23a shown in Figs. 1 to 4, inclusive, and described above, the bars 64 and 65 being resilient so that there may be relative movement between the lens 10e and the bracket member 14e without injury to the lens.

Figure 13:
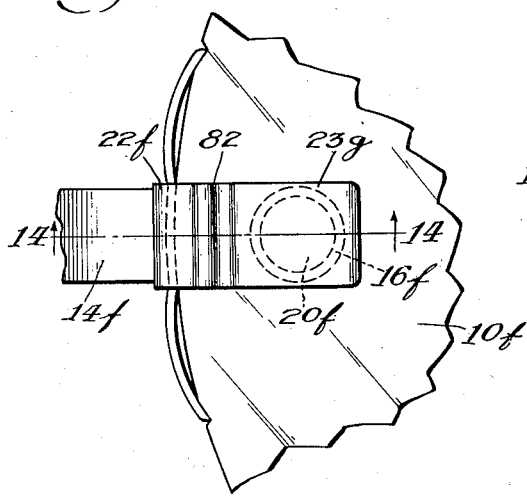
Fig. 13 is a front elevation of a lens mounting which embodies another form of the invention.
Figure 14:
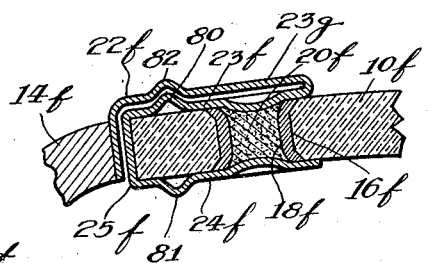
Fig. 14 is a section taken on line 14—14 of Fig. 13.

Figs. 13 and 14 illustrate a form of the invention which resembles that form illustrated in Figs. 1 to 4, inclusive. A lens 10f is secured to a bracket member 14f by a member 22f resembling the member 22 described above. The member 22f comprises bars 23f, 24f, 25f and 23g which have the same functions as the bars 23, 24, 25 and 23a, respectively, described above, the free end of the bar 25g being formed integral with or soldered to the bracket member 14f. Intermediate their ends, the bars 23f, 24f and 23g are provided with kinks 80, 81 and 82, respectively so that the bars may be lengthened or shortened to adjust them for lenses of different dimensions. Thus, lenses may differ in thickness or holes 16f provided therein may be located different distances from the edges thereof. The holes 16f in the lens 10f is provided with a tubular rivet 18f to which the bars 23f and 24f are secured by solder 20f.

It is understood, of course, that the bar 23g is resilient and permits movement of the lens 10f relative to the bracket member 14f.

Figure 15:
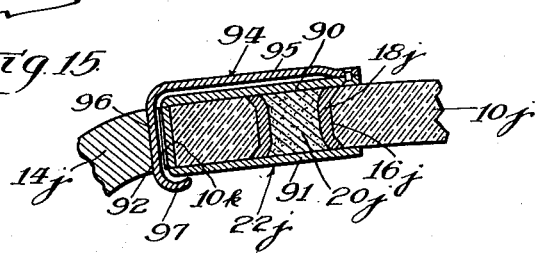
Fig. 15 is a section resembling Fig. 2, but illustrating another form of the invention.

Another form of the invention is illustrated in Fig. 15. 10j designates a lens which is provided with a drilled hole 16j, the hole 16j being beveled at its ends. Fitting snugly in the hole 16j, is a tubular metallic rivet 18j which is filled with solder 20j. The edge of the lens 10j is notched as at 10k.

A U-shaped member 22j is fixed to the lens 10j. The U-shaped member 22j comprises integral bars 90, 91 and 92. The bars 90 and 91 are disposed on opposite sides of the lens 10j and are secured to the tubular member 18j by the solder 20j. The bar 92 projects into the notch 10k and prevents the member 22j from being angularly displaced around the longitudinal axis of the tubular member 18j. Riveted or otherwise secured to the free end of the bar 90 is a spring member 94 which comprises a bar 95 extending substantially parallel to the bar 90 but spaced a slight distance therefrom. Extending substantially at right angles to the bar 95 and formed integral therewith is a bar 96 which extends parallel to the bar 92 and is spaced a slight distance therefrom. The free end of the bar 96 is designated by the reference character 97. It will be noted that the end portion 97 of the bar 96 is bent to lie adjacent the bar 91. The construction is such that if the spring member 94 is displaced in a clock-wise direction (Fig. 15) around the point at which it is attached to the bar 90, the end portion 97 of the bar 96 will engage the bar 91 and limit such displacement.

Soldered or otherwise secured to the bar 96 is a bracket member 14j which has the same function as the bracket 14 described above.

The spring member 94 permits relative displacement between the lens 10j and the bracket member 14j, but this displacement is limited by the bar 95 and the bent end 97 of the bar 96. The spring member 94 may be made of the same metal as the U-shaped member 22j if that metal is sufficiently resilient or the member 94 may be made from a different metal such as spring steel if it is so desired.

It will be readily understood that the constructions described above may be employed for connecting the lenses to the bridge members extending between the lenses or for securing the lenses to the bracket members to which the bows are attached. Therefore, the terms "bracket members" and "mounting members" are employed in the claims to include the bridge members and the bracket members to which the bows are attached.

While we have shown and described certain embodiments of our invention, it is to be understood that it is capable of many modifications. Changes, therefore in the construction and arrangement may be made without departing from the spirit and scope of the invention as disclosed in the appended claims, in which it is our intention to claim all novelty inherent in our invention as broadly as possible, in view of the prior art.

We claim:

1. In a pair of eyeglasses, the combination with a lens having a hole drilled therethrough, of a tubular member fitting snugly in said hole, solder in said tubular member, and a mounting member carrying said lens, said mounting member comprising a body portion, a U-shaped part secured to said tubular member by said solder, and a plurality of spring members connecting said U-shaped part to said body portion.

2. In a pair of eyeglasses, the combination with a lens, of a member carrying said lens, said member comprising a bracket body, a U-shaped portion straddling the lens and engaging the peripheral edge of the lens, and a resilient metal strap formed integral with an arm of said U-shaped member and doubled back thereon, said resilient strap having its free end connected to the bracket body of said lens-carrying member.

3. In a pair of eyeglasses, the combination with a lens, of a member carrying said lens, said member comprising a bracket body, a U-shaped portion straddling the lens and abutting the edge of the lens, and a resilient metal strap secured to the extremity of an arm of said U-shaped member and doubled back thereon, said resilient strap having its free end connected to said bracket body.

4. In a pair of eyeglasses, the combination with a lens, of a member carrying said lens, said member comprising a bracket body, a U-shaped member straddling the lens and secured thereto, said U-shaped member having one arm doubled back thereon along one arm and along the rear wall thereof to provide a resilient metal strap, the free end of which is connected to said bracket body.

5. In a pair of eyeglasses, the combination with a lens, of a member carrying said lens, said member comprising a bracket body, a U-shaped member having its bend portion contacting the edge of the lens and its arms straddling the lens, and a resilient metal strap secured to the body of said bracket and extending over the upper arm of said U-shaped member and secured to the forward end of said arm, said strap providing a space between it and the upper arm of said U-shaped member.

FREDERICK A. BRAUCHT.
AUSTIN B. BELGARD.